(12) United States Patent
Lee et al.

(10) Patent No.: US 11,092,670 B2
(45) Date of Patent: Aug. 17, 2021

(54) SIGNAL COMPRESSION METHOD, SIGNAL COMPRESSION APPARATUS, VEHICLE, AND LIGHT DETECTION AND RANGING (LIDAR) SYSTEM

(71) Applicants: HYUNDAI MOTOR COMPANY, Seoul (KR); KIA MOTORS CORPORATION, Seoul (KR)

(72) Inventors: Wanjae Lee, Suwon-si (KR); Jinhyuk Choi, Miryang-si (KR); TaeDong Oh, Suwon-si (KR); Haeryong Lee, Suwon-si (KR); Youngchul Oh, Seongnam-si (KR); Kicheol Shin, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 249 days.

(21) Appl. No.: 16/186,083

(22) Filed: Nov. 9, 2018

(65) Prior Publication Data
US 2019/0310350 A1 Oct. 10, 2019

(30) Foreign Application Priority Data
Apr. 5, 2018 (KR) .................. 10-2018-0039446

(51) Int. Cl.
*G01S 7/48* (2006.01)
*G01S 17/42* (2006.01)
*G01S 17/93* (2020.01)
*G01S 17/931* (2020.01)

(52) U.S. Cl.
CPC ............ *G01S 7/4808* (2013.01); *G01S 17/42* (2013.01); *G01S 17/931* (2020.01)

(58) Field of Classification Search
CPC ....... G01S 17/42; G01S 17/931; G01S 7/4808
USPC ....................................................... 702/159
See application file for complete search history.

(56) References Cited

U.S. PATENT DOCUMENTS

| 9,753,124 | B2 | 9/2017 | Hayes | |
| 2005/0088335 | A1* | 4/2005 | Stephens | G01S 13/18 342/146 |
| 2005/0213074 | A1* | 9/2005 | Hoashi | G01C 3/08 356/4.09 |
| 2007/0219720 | A1* | 9/2007 | Trepagnier | G05D 1/0278 701/300 |

* cited by examiner

*Primary Examiner* — John H Le

(57) ABSTRACT

A signal compression method, a signal compression apparatus, a vehicle, and a distance measurement system are provided, which can compress the LiDAR sensor signal without a loss. The signal compression method includes a division operation in which data detected by a distance measurement device is divided into a distance component and an angle component; and a preprocessing operation in which at least one of rearranging the angle component and inserting a dummy signal into arrangement of the angle component is performed such that the arrangement of the angle component has periodicity.

19 Claims, 16 Drawing Sheets

FIG. 6

| DISTANCE | ... | 13 | 11 | 15 | 14 | 17 | 20 | 22 | 27 | 9 | 8 | 5 |
|---|---|---|---|---|---|---|---|---|---|---|---|---|
| HORIZONTAL ANGLE INDEX | ... | 5 | 7 | 7 | 7 | 7 | 7 | 10 | 10 | 10 | 13 | 13 |
| VERTICAL ANGLE INDEX | ... | 3 | 1 | 1 | 2 | 2 | 3 | 2 | 1 | 3 | 1 | 2 |

M=5

(I)

M=5

| (1, 7, 11) ① | (1, 7, 15) ② | (0, 0, 0) | (0, 0, 0) | (0, 0, 0) |
|---|---|---|---|---|
| (2, 7, 14) ③ | (2, 7, 17) ④ | (0, 0, 0) | (0, 0, 0) | (0, 0, 0) |
| (3, 7, 20) ⑤ | (0, 0, 0) | (0, 0, 0) | (0, 0, 0) | (0, 0, 0) |

N=3

(II)

| DISTANCE | ... | 13 | 11 | 14 | 20 | 15 | 17 | 22 | 27 | 9 | 8 | 5 |
|---|---|---|---|---|---|---|---|---|---|---|---|---|
| HORIZONTAL ANGLE INDEX | ... | 5 | 7 | 7 | 7 | 7 | 7 | 10 | 10 | 10 | 13 | 13 |
| VERTICAL ANGLE INDEX | ... | 3 | 1 | 2 | 3 | 1 | 2 | 2 | 1 | 3 | 1 | 2 |

M=5

(III)

(Ⅰ)

(Ⅱ)

SIGNAL COMPRESSION METHOD, SIGNAL COMPRESSION APPARATUS, VEHICLE, AND LIGHT DETECTION AND RANGING (LIDAR) SYSTEM

CROSS-REFERENCE TO RELATED APPLICATION

The present application claims priority to and the benefit of Korean Patent Application No. 10-2018-0039446, filed on Apr. 5, 2018, which is incorporated herein by reference in its entirety.

FIELD

The present disclosure relate to an apparatus and method for compressing a Light Detection And Ranging (LiDAR) sensor signal.

BACKGROUND

The statements in this section merely provide background information related to the present disclosure and may not constitute prior art.

A Light Detection And Ranging (LiDAR) sensor relates to a technology for measuring a distance and direction to a target object, speed and temperature of the target object, distribution of materials of the target object, and density characteristics of the target object, etc. by emitting a laser beam to the target object. The LiDAR sensor is generally used for more precise observation of atmospheric properties and distance measurement using laser light that can generate high energy density and pulse signals with shorter cycles.

Although LiDAR sensor technology was first conceived of in the 1930s to analyze air density in the sky through scattering intensity of searchlights, many developers and companies begun intensively researching and developing LiDAR sensor associated technology due to laser light found in the 1960s. As laser light source technology has been continuously developed since the 1970s, LiDAR sensor technologies applicable to various fields have recently been developed. LiDAR sensors are mounted to aircraft, satellites, etc. and are thus used as important observation technology for accurate atmospheric analysis and observation of the Earth's environment. In addition, LiDAR sensors are mounted to spacecraft and exploration robots, such that the LiDAR sensors are used to supplement camera functions such as a function for measuring the distance to a target object.

In recent times, LiDAR sensor technology has been widely used to search for peripheral regions for autonomous driving of vehicles. That is, the LiDAR sensor is mounted to a vehicle, measures the location and distance of obstacles such as buildings, pedestrians, and other vehicles located in the vicinity of the vehicle equipped with the LiDAR sensor, such that LiDAR sensor technology has been actively used for autonomous driving of vehicles.

SUMMARY

Therefore, it is an aspect of the present disclosure to provide an apparatus and method for losslessly compressing a LiDAR sensor signal.

Additional aspects of the disclosure will be set forth in part in the description which follows and, in part, will be obvious from the description, or may be learned by practice of the disclosure.

In accordance with an aspect of the present disclosure, a signal compression method includes a first division operation in which data detected by a distance measurement device is divided into a distance component and an angle component, a second division operation in which the angle component is divided into at least two linear independent basis, and a preprocessing operation in which at least one of rearranging the angle component and inserting a dummy signal into arrangement of the angle component is performed such that the arrangement of the angle component has periodicity.

The division of the angle component in the first division operation may include dividing the angle component into a first angle component and a second angle component in a condition in which a basis vector used for division of a signal vector is not identical to a linear dependent component, wherein the divided first angle component is monotonic increase or decrease.

The angle component may include a first angle component and a second angle component, and the rearrangement of the angle component may include rearranging the data on the basis of a first angle component of the same index in a manner that the second angle component has exact or near periodicity.

The rearrangement of the angle component may include storing data detected by the distance measurement data in an (N×M) memory space on the basis of an index of the second angle component, and storing data of the second angle component of the same index in the same row of the (N×M) memory space, and retrieving and rearranging the data stored in the (N×M) memory space in a column direction of the (N×M) memory space, and allowing the second angle component of the data detected by the distance measurement device to have exact or near periodicity.

The insertion of the dummy signal may be achieved in the rearranged data.

The dummy signal may have an invalid distance component.

The dummy signal may have a value in which an index of a first angle is identical to that of preceding data from among the rearranged data and an index of a second angle is matched with a standard period.

The standard period may be a period of a second angle index having no redundancy of valid data detected by the distance measurement device.

The signal compression method may further include performing probability distribution concentration to concentrate probability distribution of the first angle component of the data detected by the distance measurement device.

The performing the probability distribution concentration may include generating a differential value of the first angle component, wherein the differential value is obtained by subtracting a former index value from a latter index value with respect to two neighboring first angle index values.

The signal compression method may further include searching for a period of the second angle component of the data detected by the distance measurement device, and calculating the number of iterations.

Expression of the searched period and the calculated number of iterations may include recording the period found between a period description start code and a period description end code, wherein the number of iterations is recorded as data shaped in a real number.

The signal compression method may further include performing probability distribution concentration of the first angle component in a manner that probability distribution of the first angle component is concentrated for the first angle component, and performing entropy coding, and performing entropy coding of the distance component and the second angle component in a condition that the probability distribution concentration of the distance component and the second angle component is not performed.

The signal compression method may further include performing probability distribution concentration of the first angle component and the second angle component such that probability distribution of the first angle component is concentrated, and performing entropy coding; and performing entropy coding of the distance component in a condition that the probability distribution concentration of the distance component is not performed.

The signal compression method may further include performing interleaving of the first angle component to perform period searching and calculation of the number of iterations, and performing entropy coding, and performing entropy coding of the distance component and the first angle component in a condition that the distance component and the first angle component are not interleaved.

The signal compression method may further include performing base change of the first angle component and the second angle component in a manner that probability distribution of the first angle component is concentrated, and performing entropy coding; and performing entropy coding of the distance component in a condition that the base change of the distance component is not performed.

The signal compression method may further include performing entropy coding of the distance component, the first angle component, and the second angle component, and merging the entropy-coded distance component, the entropy-coded first angle component, and the entropy-coded second angle component.

In accordance with another aspect of the present disclosure, a vehicle includes a distance measurement device configured to measure a distance and direction of a target object, and a signal compression device configured to compress detection data generated from the distance measurement device. The signal compression device includes dividing detection data of the distance measurement device into a distance component and an angle component, and performing at least one of rearranging the angle component and inserting a dummy signal into arrangement of the angle component such that the arrangement of the angle component has periodicity.

In accordance with another aspect of the present disclosure, a signal compression device includes, upon receiving detection data from the distance measurement device, dividing the received detection data into a distance component and an angle component; and performing at least one of rearranging the angle component and inserting a dummy signal into arrangement of the angle component such that the arrangement of the angle component has periodicity.

In accordance with another aspect of the present disclosure, a distance measurement system includes a distance measurement device configured to measure a distance and direction of a target object; a signal compression device configured to receive detection data from the distance measurement device, divide the received detection data into a distance component and an angle component, perform preprocessing in which at least one of rearranging the angle component and inserting a dummy signal into arrangement of the angle component is performed such that the arrangement of the angle component has periodicity, and compress the detection data of the distance measurement device, and a signal restoration device configured to restore the detection data compressed by the signal compression device to an original signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a conceptual diagram illustrating rearrangement of points having the same horizontal angles using the LiDAR signal compression method in one form of the present disclosure;

Figure 1:
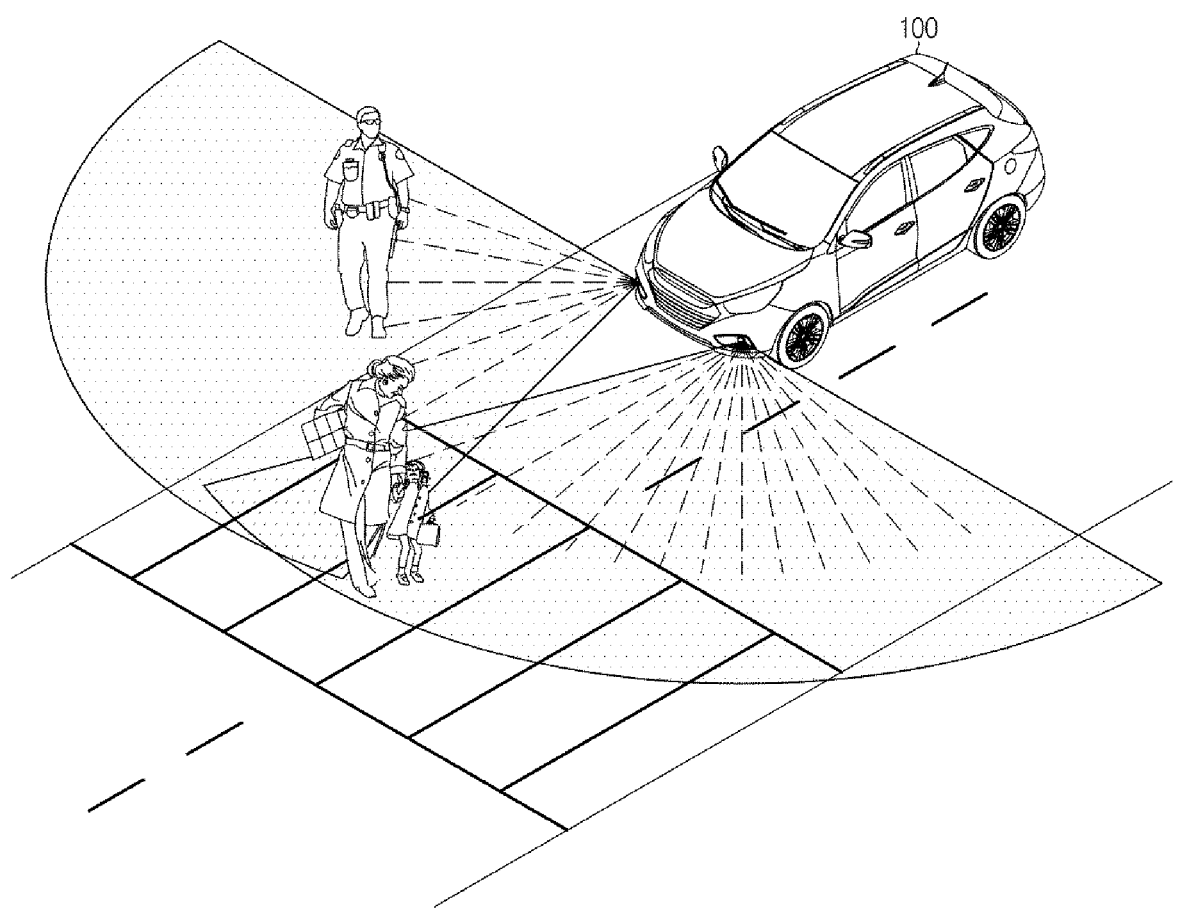
FIG. 1 is a view illustrating a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view illustrating a vehicle 100 in some forms of the present disclosure. Referring to FIG. 1, the vehicle 100 may include a LiDAR sensor module acting as one of devices for implementing autonomous traveling. As shown in FIG. 1, a single high-definition LiDAR sensor module or a plurality of low-definition LiDAR sensor modules may be applied to the vehicle 100, such that the vehicle 100 may acquire three-dimensional (3D) high-definition image information by recognizing 3D peripheral regions of the vehicle 100.

Figure 2:
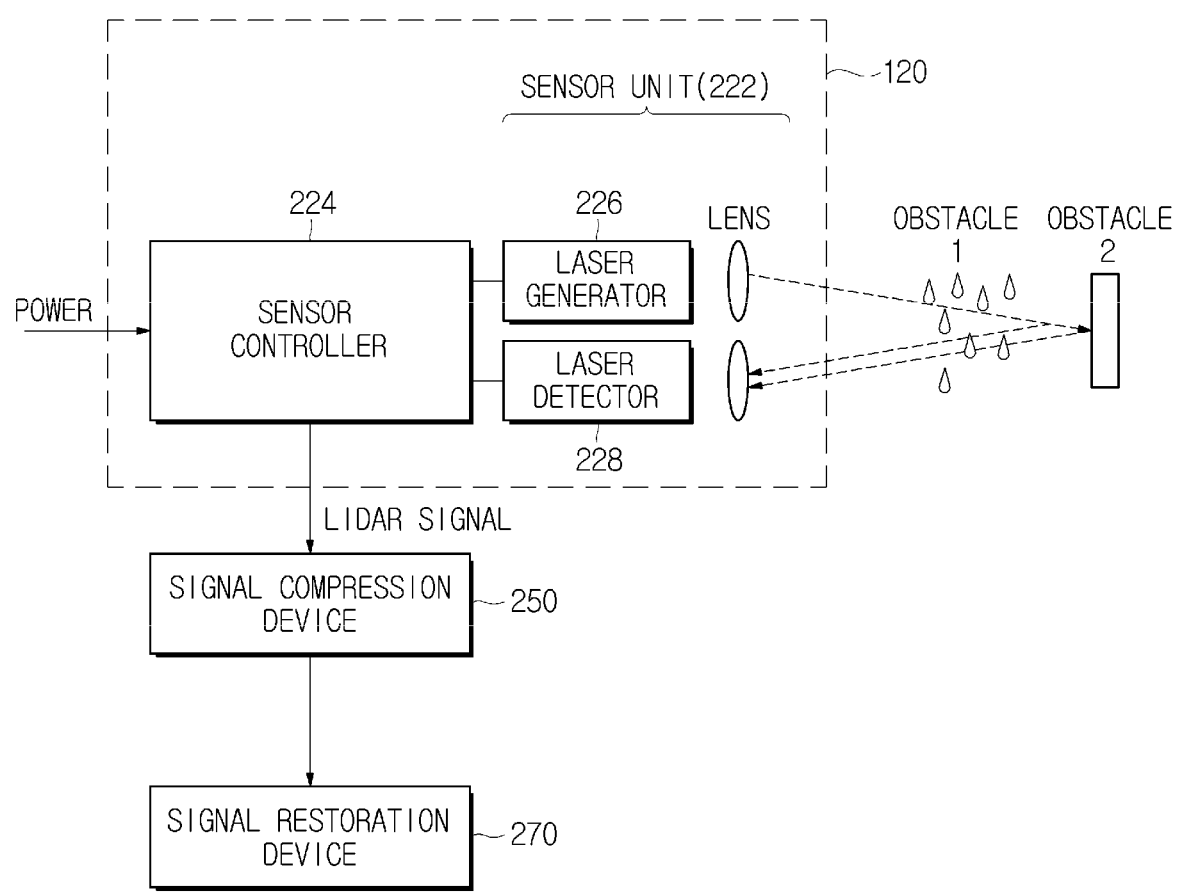
FIG. 2 is a conceptual diagram illustrating a LiDAR system in one form of the present disclosure.

FIG. 2 is a conceptual diagram illustrating a LiDAR system in some forms of the present disclosure. Referring to FIG. 2, the LiDAR sensor module 120 may include a sensor unit 222 and a sensor controller 224. A LiDAR signal generated by the LiDAR sensor module 120 may be transmitted to a separate signal compression device 250 such that signal compression may be achieved by the signal compression device 250. The LiDAR signal compressed by the signal compression device 250 may be transmitted to a signal restoration device 270 of a load (e.g., a vehicle ECU) that uses the LiDAR signal, such that the resultant signal may be restored to the initial LiDAR signal obtained prior to compression. The apparatus and method for compressing the LiDAR signal in some forms of the present disclosure may implement lossless compression in a manner that the LiDAR signal generated by the LiDAR sensor module 120 can be losslessly restored by the signal restoration device 270.

Although the signal compression device 250 and the LiDAR sensor module 120 are separated from each other as shown in FIG. 2, it should be noted that the signal compression device 250 may also be provided, as one of constituent elements of the LiDAR sensor module 120, in the LiDAR sensor module 120.

The sensor unit 222 of the LiDAR sensor module 120 may basically include a laser generator 226 and a laser detector 228. The laser generator 226 may emit laser light. The laser detector 228 may detect the laser light reflected from an obstacle (e.g., a person or object). A point at which the laser light emitted by the laser generator 226 is reflected from the obstacle will hereinafter be referred to as a LiDAR point. Preferably, in order to correctly recognize the distance and direction of obstacles present in the peripheral regions of the vehicle 100, a plurality of LiDAR points (strictly speaking, numerous LiDAR points) may be generated. A group composed of many LiDAR points will hereinafter be referred to as a LiDAR point cloud. The vehicle 100 may acquire the presence or absence of peripheral obstacles and the distance and location of the peripheral obstacles, etc. by analyzing the LiDAR point cloud.

The sensor controller 224 of the LiDAR sensor module 120 may generate many LiDAR points by controlling the sensor unit 222, thereby detecting one or more obstacles using the LiDAR points. Specifically, the sensor controller 224 may perform signal processing of the LiDAR points received by the sensor unit 222, thereby generating LiDAR signals. The LiDAR signals generated by the sensor controller 224 may be configured in the form of digital signals, such that the digital signals indicating the LiDAR signals can be transmitted to the signal compression device 250.

Figure 3:
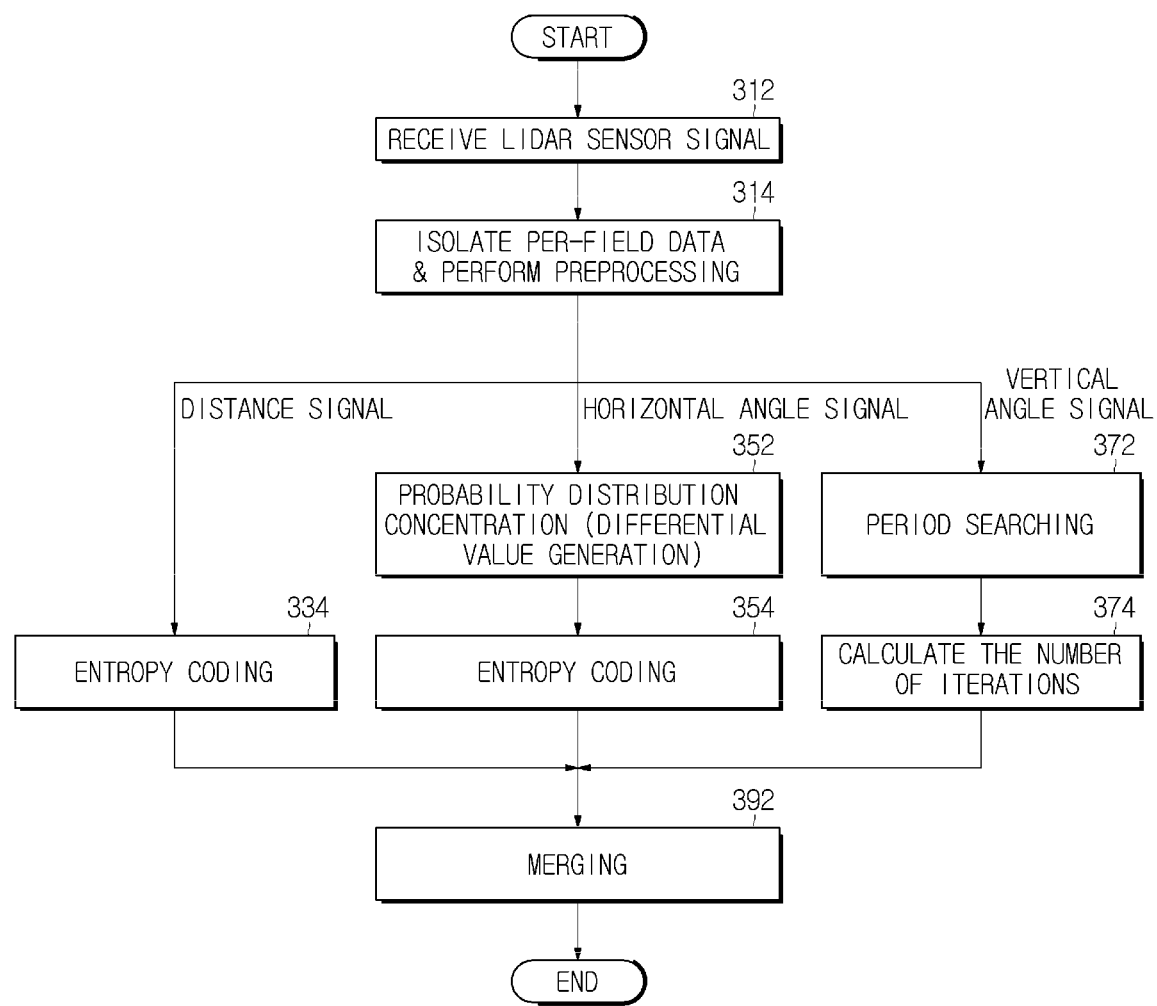
FIG. 3 is a flowchart illustrating a method for compressing a LiDAR sensor signal in one form of the present disclosure.

FIG. 3 is a flowchart illustrating a method for compressing a LiDAR sensor signal in some forms of the present disclosure. LiDAR signal compression shown in FIG. 3 may be achieved by the signal compression device 250 shown in FIG. 2.

Referring to FIG. 3, the signal compression device 250 may receive one or more LiDAR signals from the sensor controller 224 of the LiDAR sensor module 120 (312).

The signal compression device 250 may analyze the received LiDAR signal, may isolate data for each field, and may perform preprocessing of the isolated data. Classification of fields for data isolation may include a distance signal, a horizontal angle signal, and a vertical angle signal. That is, the LiDAR signal generated at a single LiDAR point may be classified into a distance component, a horizontal angle component, and a vertical angle component. Preprocessing of the LiDAR signal may include rearrangement of points and insertion of one or more dummy signals.

The signal compression device 250 may perform entropy coding of the distance signal (334). Entropy coding may refer to a data compression method for reducing a total length of data by allowing codes indicating symbols to have different lengths according to the probability of generating the symbols.

The signal compression device 250 may perform probability distribution concentration by generating one or more differential values of the horizontal angle signal (352). Since the horizontal angle has monotone changing characteristics (e.g., monotone decreasing or monotone increasing), the signal compression device 250 may concentrate signal distribution by generating the differential values. The signal compression device 250 may perform entropy coding of the horizontal angle signal in which probability distribution concentration is completed (354).

The signal compression device 250 may search for a period of the vertical angle signal (372), and may calculate the number of iterations of the vertical angle signal (374). If a signal deviating from the searched period occurs, the signal compression device 250 may detect the deviated signal, and may repeatedly perform searching of a new period and calculation of the number of iterations. The operation 372 for searching for the period of the vertical angle signal and the operation 374 for calculating the number of iterations of the vertical angle signal may be needed to acquire a repetitive pattern, which is composed of a pair of a temporary period and the number of iterations, from the received LiDAR signal.

After completion of a series of processes for each of the distance signal, the horizontal angle signal, and the vertical angle signal, the completely processed data may be merged (392).

Figure 4:
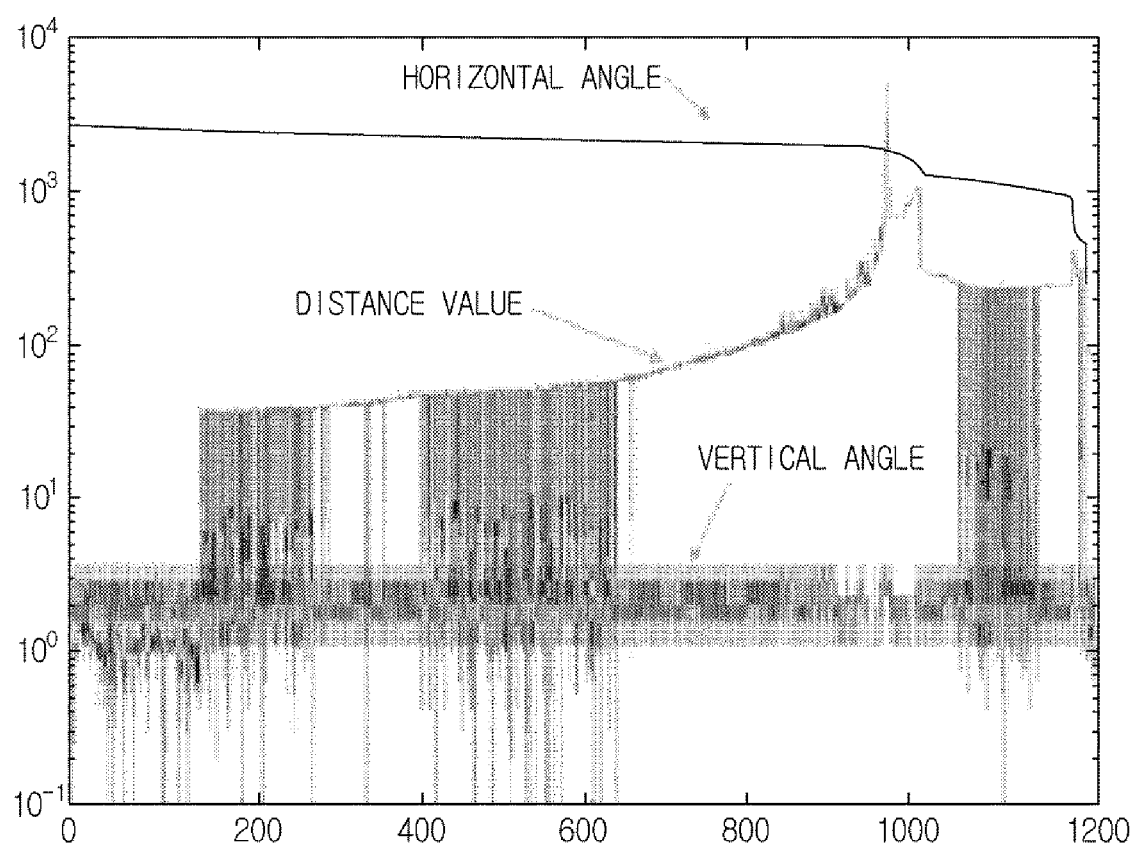
FIG. 4 is a view illustrating various components of a LiDAR signal acquired from a single point.

FIG. 4 is a view illustrating various components of a LiDAR signal acquired from a single point. Referring to FIG. 4, the LiDAR signal may include three components, i.e., a distance component, a vertical angle, and a horizontal angle. If the sensor unit 222 is implemented as a Focal Plane Array (FPA) sensor, the horizontal angle and the vertical angle may be decided according to the order of arrangement of receivers. If the sensor unit 222 is implemented as a rotary-type sensor configured to use a transceiver composed of a 1D (one-dimensional) array (i.e., a first column), a rotation angle may be used as the horizontal angle and the installation position of each laser may be used as the vertical angle.

Irrespective of LiDAR sensor module types, the horizontal angle can be monotonously changed and the vertical angle can periodically appear, as shown in FIG. 4. Output data obtained at an invalid point may not be omitted as necessary. In this case, more regular variation in which two linear changes composed of zero '0' and a single constant are repeated may occur in the horizontal angle, and the vertical angle may have perfect periodic signal characteristics. Some forms of the present disclosure may propose a method for losslessly compressing the LiDAR signal using signal output characteristics of the LiDAR sensor such that the restored signal and the original signal can be completely identical to each other through lossless compression of the LiDAR signal.

Figure 5:
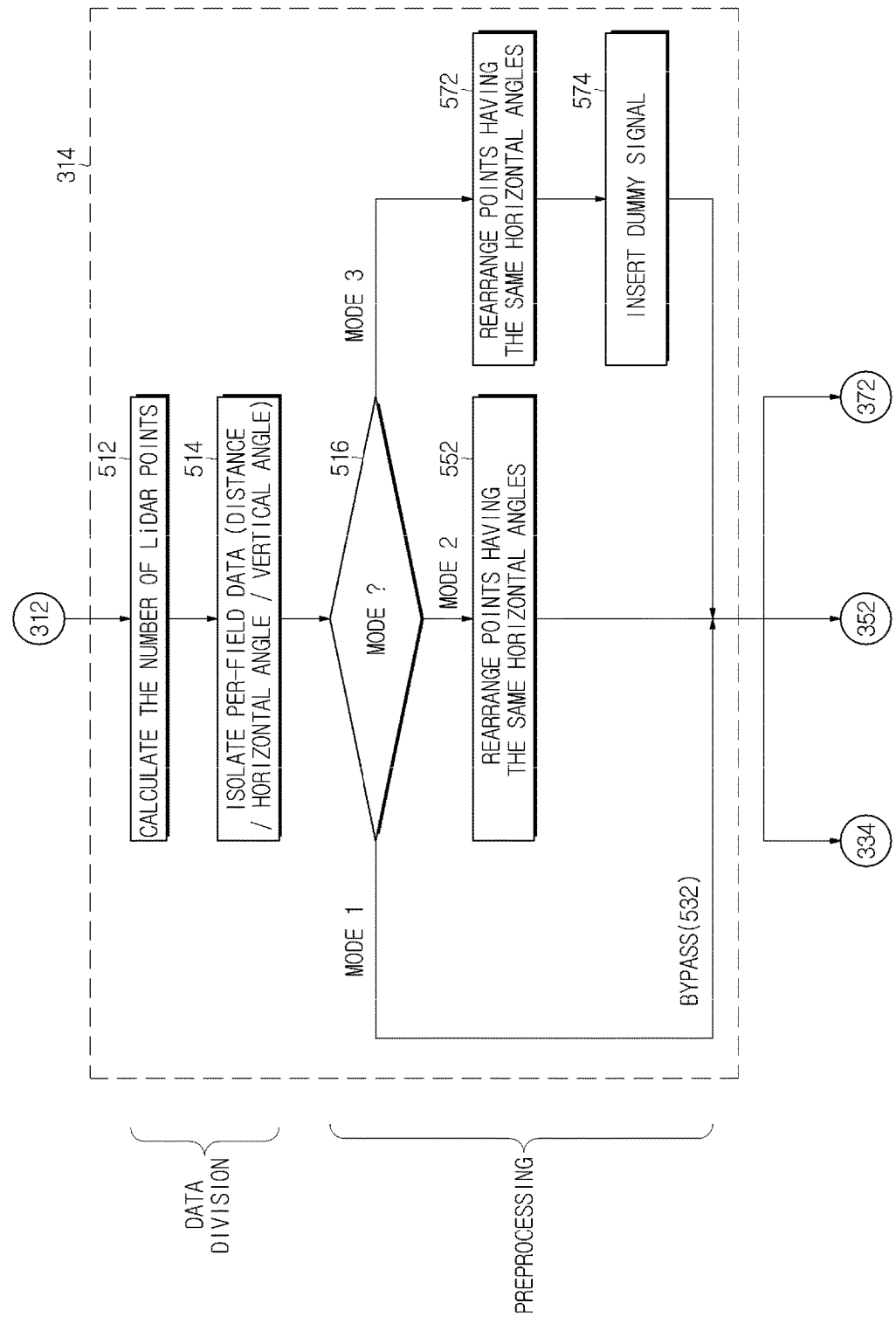
FIG. 5 is a flowchart illustrating operations for isolating and preprocessing data for each field using the LiDAR signal compression method shown in FIG. 3.

FIG. 5 is a flowchart illustrating operations for isolating and preprocessing data for each field using the LiDAR signal compression method shown in FIG. 3. Referring to FIG. 5, reference numerals 512 to 514 may refer to data isolation processes, and reference numerals 516 to 574 may refer to data preprocessing processes.

Referring to FIG. 5, the signal compression device 250 may first calculate the number of LiDAR points (512). Subsequently, the signal compression device 250 may isolate per-field data of each LiDAR point (514). That is, the signal compression device 250 may analyze the received LiDAR signal, and may isolate data of individual fields (i.e., distance, horizontal angle, and vertical angle). The signal compression device 250 may perform a predetermined mode corresponding to the isolation result for each field (516). The predetermined mode may include a first mode 1, a second mode 2, and a third mode 3.

In preprocessing of the first mode 1, the signal compression device 250 may proceed to a subsequent operation without execution of any task (i.e., bypassing) (532).

In preprocessing of the second mode 2, the signal compression device 250 may select only LiDAR points having the same horizontal angles from among the plurality of LiDAR points, and may rearrange the selected LiDAR points (552).

In preprocessing of the third mode 3, the signal compression device 250 may select only LiDAR points having the same vertical angles from among the plurality of LiDAR points, and may rearrange the selected LiDAR points (572). In preprocessing of the third mode 3, the signal compression device 250 may insert a dummy signal into the rearranged LiDAR points having the vertical angles (574). The reason why the dummy signal is inserted is to allow a vertical angle signal to be a complete periodic signal.

In FIG. 5, rearrangements 552 and 572 of the points having the same horizontal angles may allow the plurality of points having the same horizontal angle indexes to be arranged so that the vertical angle signals may have a maximum of periodicity. Although the signals having the same horizontal angles are rearranged within the corresponding range, a total of signals may not be affected by such arrangement and the LiDAR signal may not deviate from unique characteristics.

Figure 7:
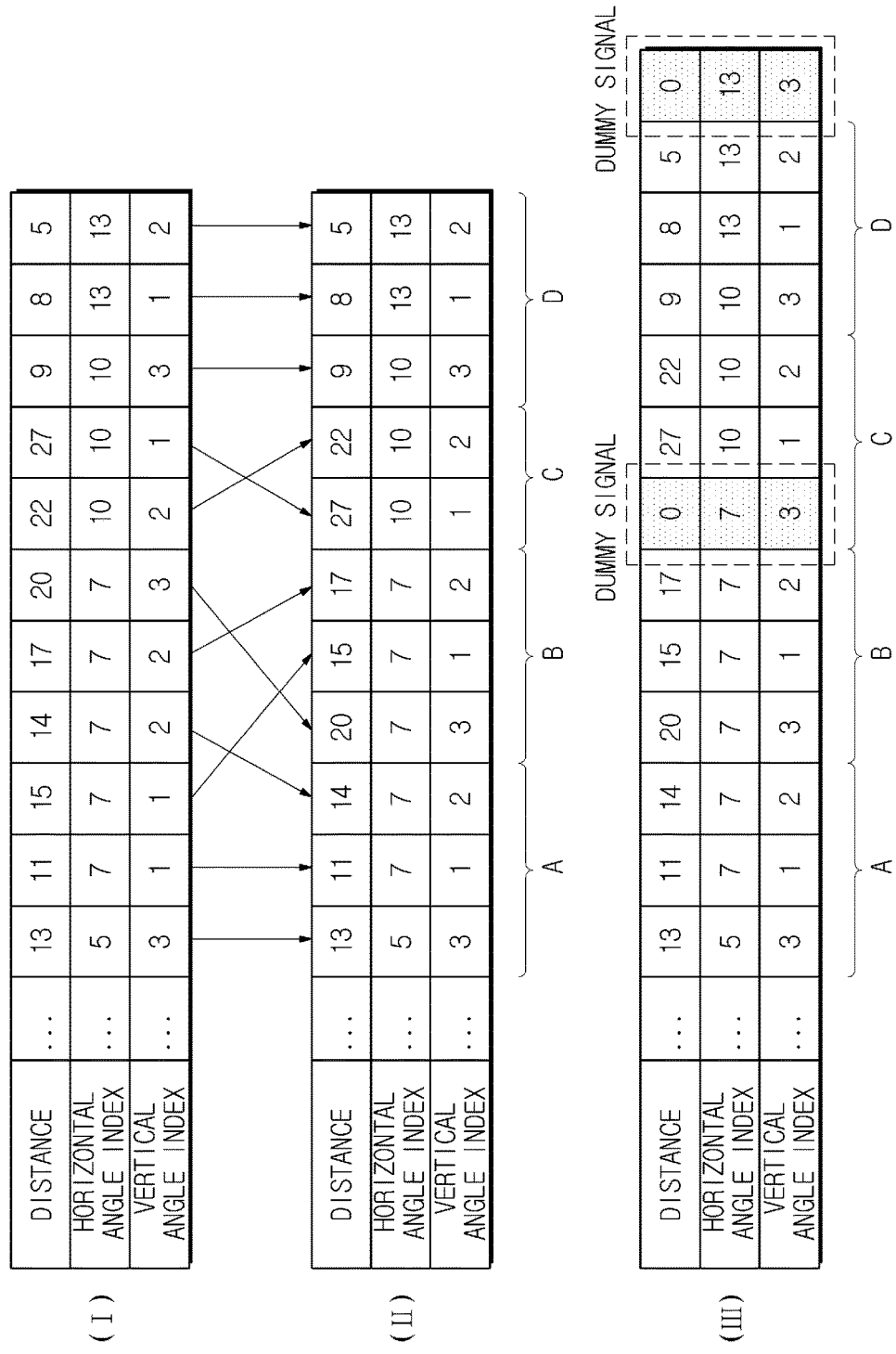
FIG. 7 is a conceptual diagram illustrating a method for inserting a dummy signal using the LiDAR signal compression method in one form of the present disclosure.

FIG. 6 is a conceptual diagram illustrating rearrangement of points having the same horizontals angle using the LiDAR signal compression method in some forms of the present disclosure. In the section 'M=5' of FIG. 6(I), points each having a horizontal angle index of 7 may be present. From among a plurality of pairs, each of which is denoted by (vertical angle index, horizontal angle index, distance), in the section 'M=5', some points having the same vertical angle indexes and the same horizontal angle indexes may be present in the section 'M=5'. For example, (1, 7, 11) and (1, 7, 15) may have the same vertical angle indexes and the same horizontal angle indexes. (2, 7, 14) and (2, 7, 17) may also have the same vertical angle indexes and the same horizontal angle indexes. (3, 7, 20) may be a single point having the same vertical angle index and the same horizontal angle index. In FIG. 6, values of respective points are stored in an (N×M) memory space while being arranged in the order of vertical angles, and the (N×M) memory space is filled with the values of the respective points in a column direction for each row (i.e., in the order of ①→②→③→④→⑤ of FIG. 6(II)), such that the respective points are stored as shown in FIG. 6(II). That is, indexes of the points in which the vertical angle index is set to 1 and the horizontal angle index is set to 7 may be stored in a first row of the memory space. Thereafter, when the indexes are read in the order of an arrow mark denoted by FIG. 6(II) and are then rearranged, it may be possible to acquire maximum periodicity (1, 2, 3) and (1, 2) as shown in the section 'M=5' of FIG. 6(III). In FIG. 6(II), (0, 0, 0) may be a null value. FIG. 7 is a conceptual diagram illustrating a method for inserting a dummy signal using the LiDAR signal compression method in some forms of the present disclosure. That is, insertion of the dummy signal shown in FIG. 7 may refer to a process for inserting a meaningless signal (i.e., a dummy signal) having a distance value of zero '0' in a manner that the result having maximum periodicity acquired by rearrangement of points illustrated in FIG. 6 may have more complete periodicity. If a signal having a period different from a predetermined standard period occurs while the rearranged signals illustrated in FIG. 6(II) are sequentially read, insertion of the dummy signal may be performed. In this case, the inserted dummy signal may be a signal that has the same horizontal angle index as the preceding signal, has a vertical angle index matched with the standard period, and has an invalid distance value (for example, the distance value is zero or infinite).

In other words, when indexes of a series of LiDAR points shown in FIG. 7(I) are rearranged through the method of FIG. 6, the result shown in FIG. 7(II) can be obtained. As shown in FIG. 7(II), each of 'A', 'B', and 'D' may have a vertical angle index having a period '3-1-2'. However, as can be seen from 'C' in FIG. 7(II), the vertical index may have a period '1-2'. In order to allow 'C' of FIG. 7(II) to have the same period as in each of 'A', 'B', and 'D', a dummy signal (3, 7, 0) shown in FIG. 7(III) may be inserted. The inserted dummy signal (3, 7, 0) may have the same horizontal angle index '7' as the preceding signal, may have the vertical angle index '3' matched with the standard period, and may have the distance value of zero '0'. As can be seen from FIG. 7(III), through insertion of the dummy signal (3, 7, 0), the vertical angle indexes of 'A', 'B', 'C', and 'D' may have the completely identical periods '3-1-2'. If necessary, the distance signal of the dummy signal may be allocated a zero value "0", or may also be allocated another meaningless (invalid) value as necessary. For example, any meaningless value selected from among measurement values (e.g., zero, an infinite value, etc.) of the LiDAR sensor module 120 may also be substituted into the distance value as necessary.

The above-mentioned period '3-1-2' may refer to a predetermined standard period, without being limited thereto. The above-mentioned period may also be allocated another value as necessary. Although the standard period is arbitrarily established irrespective of actual output data, the established standard period may not affect compression efficiency. However, if a period of non-overlapping vertical angle indexes obtained from a situation in which all signals are valid is used as the standard period, the number of calculations can be further reduced.

Figure 8:
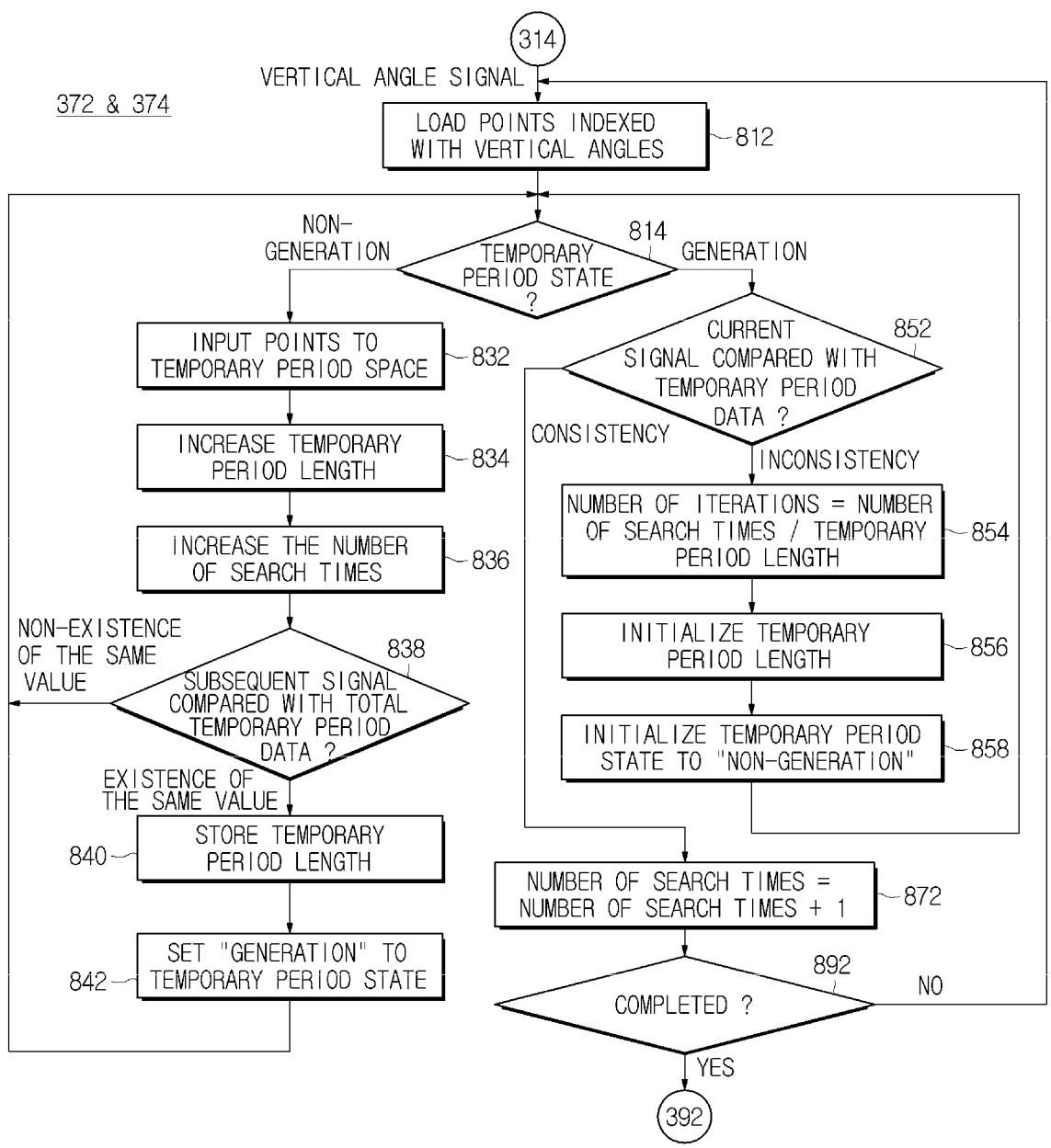
FIG. 8 is a flowchart illustrating a method for searching for a period and calculating the number of iterations using the LiDAR signal compression method in one form of the present disclosure.
Figure 9:
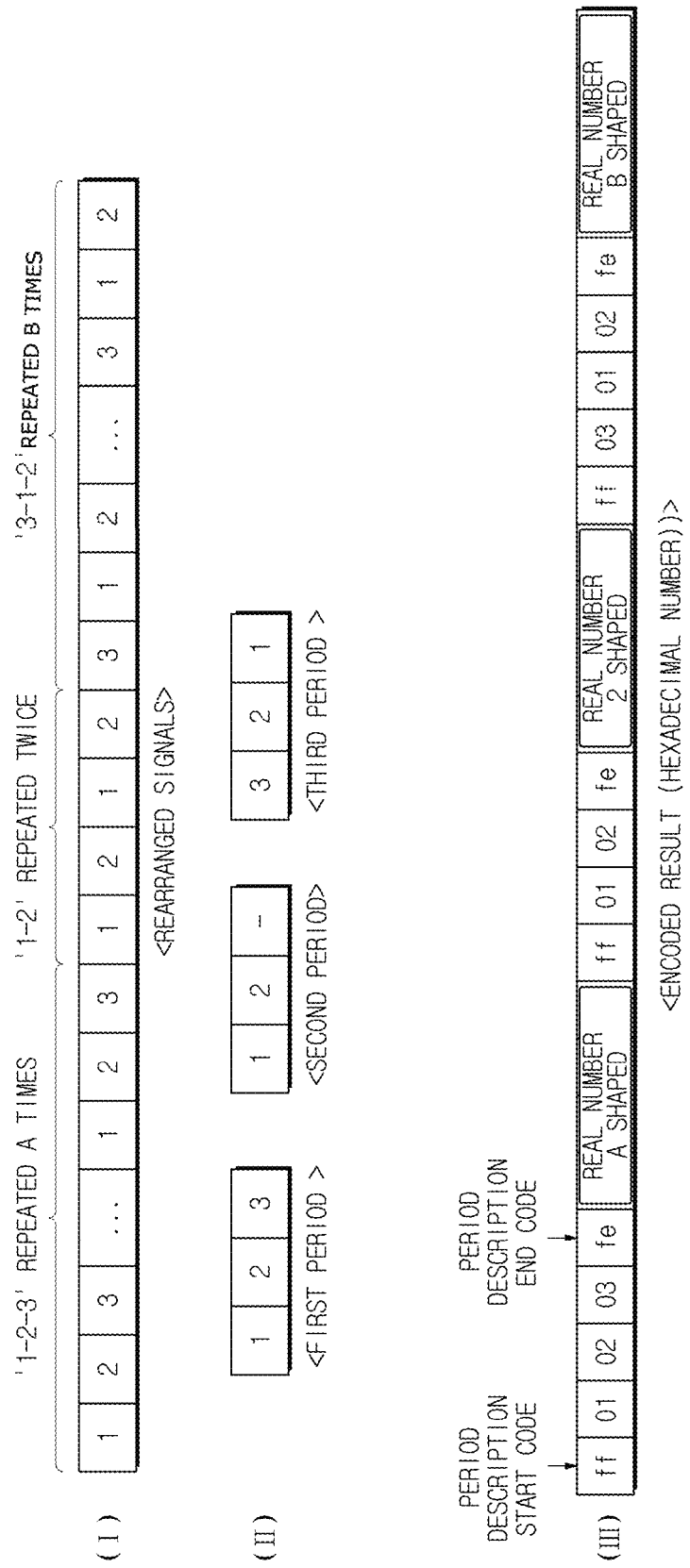
FIG. 9 is a conceptual diagram illustrating the encoding process and result based on the method for searching for a period and calculating the number of iterations shown in FIG. 8.

FIG. 8 is a flowchart illustrating a method for searching for a period and calculating the number of iterations using the LiDAR signal compression method in some forms of the present disclosure. FIG. 9 is a conceptual diagram illustrating the encoding process and result based on the method for searching for a period and calculating the number of iterations shown in FIG. 8.

Referring to FIG. 8, a series of operations (see "non-generation" shown in the left side of FIG. 8) performed in a situation in which a temporary period is not generated may refer to period searching 372 (see FIG. 3), and a series of operations (see "generation" shown in the right side of FIG. 8) performed in a situation in which the temporary period is generated may refer to calculation of the number of iterations 374 (see FIG. 3).

The signal compression device 250 may load a plurality of points indexed with respect to vertical angles from among a plurality of LiDAR points (812). The loaded vertical-angle index points are shown in FIG. 9(I). The vertical angle index points shown in FIG. 9(I) may be identical to those of the rearrangement results shown in FIG. 6(III). The period searching (372) and the calculation of the number of iterations (374) may also be applied only to the vertical angle components of the LiDAR signals as necessary. The signal compression device 250 may confirm generation and non-generation of the temporary period with respect to the loaded vertical angle indexes (814).

When the temporary period is not yet generated ("Non-generation" in 814), the signal compression device 250 may generate the temporary period through the following operations. In more detail, the signal compression device 250 may input the vertical indexes of the points to a memory's temporary period space provided to generate the temporary period (832). Subsequently, the signal compression device 250 may increase the length of the temporary period and the number of search times stepwise (834), and at the same time may continuously search for the temporary period (836). The signal compression device 250 may compare a subsequent signal with entire temporary period data (838). When the result of comparison between the subsequent signal and the entire temporary period data indicates that the same value as that of the subsequent signal is present in the entire temporary period data ("Existence of the same value" in 838), the signal compression device 250 may store length information of the temporary period in the memory (840), and may change a flag corresponding to the temporary period state to "Generation" (842). When the same value as that of the subsequent signal is not present in the entire temporary period data ("Non-existence of the same value" in 838), the signal compression device 250 may return to operation 814 so that the signal compression device 250 may repeatedly perform determination as to whether the temporary period is generated (814).

If the temporary period has already been generated ("Generation" in 814), the signal compression device 250 may compare a current signal with total temporary period data (852). If the result of comparison between the current signal and the total temporary period data indicates that a value identical to the current signal is not present in the total temporary period data ("Inconsistency" in 852), the signal compression device 250 may establish the number of iterations (854). The number of iterations may be denoted by "Number of Iterations=Number of Search Times/Length of Temporary Period". Subsequently, the signal compression device 250 may initialize the length of the temporary period (856), and may change the flag of the temporary period to "Non-Generation" and then perform initialization (858).

If the result of comparison between the current signal and the total temporary period data indicates that the value identical to the current signal is present in the total temporary period data ("Consistency" in 852), the signal compression device 250 may increase the number of search times by one (872).

If the number of search times reaches a target number of search times (Yes in 892), the signal compression device 50 may finish compression of the LiDAR sensor signal. In contrast, if the number of search times does not reach a target number of search times (No in 892), the signal compression device 250 may return to the point load operation 812 in which the points are indexed with respect to vertical angles, such that period searching and calculation of the number of iterations are repeated. In the operation of searching the vertical angle period, a total number of layers of the sensor unit 222 is set to a maximum value, so that a process of searching for the period of a current signal is performed. If signals are iterated (or repeated), the process of such iteration is described, and the number of iterations is recognized, such that redundant signals can be removed. However, signal limitation occurs according to a mode selected in the preprocessing and rearrangement process of FIG. 5 and it is impossible to assume that individual layers of the sensor unit 222 have the same number of data pieces, such that it is impossible to allocate a single period to all signals. Therefore, the operation for searching for the period and the operation for calculating the number of iterations may be repeated until the last signal is processed.

An exemplary case of non-generation of the temporary period will hereinafter be described with reference to FIG. 9. As for the loaded vertical angle indexes illustrated in FIG. 9(I), the period '1-2-3' may be repeated A times, the period '1-2' may be repeated twice, and the period '3-1-2' may be repeated B times. The signal compression device 250 may sequentially read values of '1-2-3', and may input the read values in a temporary period space. Then, the signal compression device 250 may read again the value of 1. However, since the value of 1 is present in the plurality of read values, the signal compression device 250 may store the read values '1-2-3' as a single temporary period, and may change a temporary period flag to "Generation". Through the above processing, the signal compression device 250 may recognize that the temporary period '1-2-3' is repeated A times.

By the above-mentioned method, it may be possible to detect that the temporary period '1-2' is repeated twice and the temporary period '3-1-2' is repeated B times. FIG. 9(II) illustrates the result of detecting the temporary periods. As illustrated in FIG. 9(III), the detection result of temporary periods may indicate the encoding result of the temporary period '1-2-3' repeated A times, the encoding result of the temporary period '1-2' repeated twice, and the encoding result of the temporary period '3-1-2' repeated B times. Referring to FIG. 9(III), in order to compress and explain the respective periods, a period description start code (ff) and a period description end code (fe) may be allocated, and the period (e.g., 1-2-3, 1-2, 3-1-2, or the like) may be inserted between the period description start code (ff) and the period description end code (fe). After the period description end code (fe), the number of iterations may be recorded. In this case, the number of iterations may be recorded as real number-shaped data.

Figure 10:
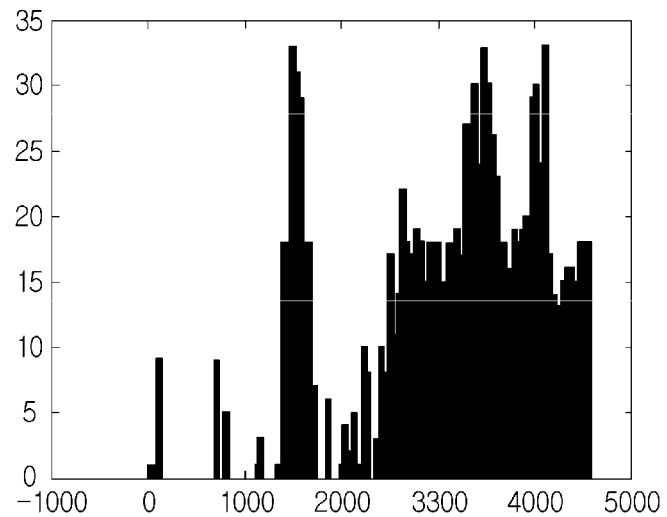
FIG. 10 is a conceptual diagram illustrating distribution of horizontal angle signals and distribution of differential values of horizontal angle signals.
Figure 10:
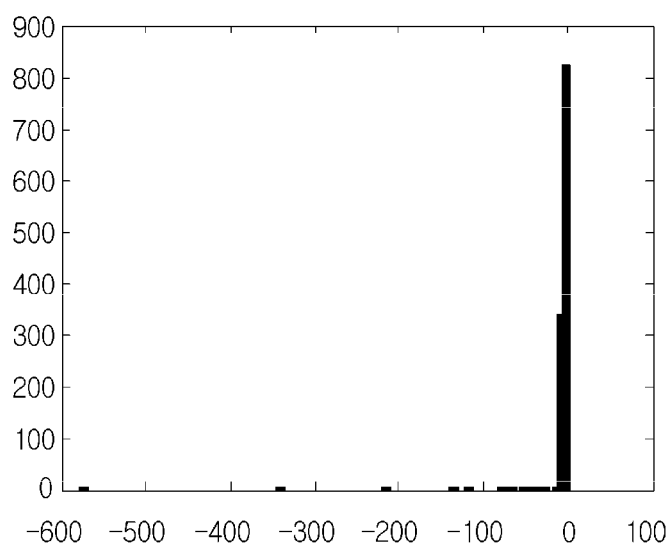

FIG. 10 is a conceptual diagram illustrating distribution of horizontal angle signals and distribution of differential values of horizontal angle signals. As previously described in operation 352 of FIG. 3, concentration of probability distribution through generation of differential values with respect to horizontal angle signals has been performed. The differential value may be obtained by subtracting the former index value from the latter index value with respect to two neighboring horizontal angle index values. The entropy encoding scheme may allocate a short code to a high-frequency-of-occurrence signal using statistical characteristics of target signals, and may allocate a long code to a low-frequency-of-occurrence signal, resulting in encoding of the target signals. Therefore, when distribution of target signals is concentrated, maximum efficiency can be obtained in the entropy encoding stage. The horizontal angle signals have monotone changing characteristics. Thus, when differential values of the horizontal angle signals are generated, distribution of the differential values are concentrated at a specific integer, such that entropy encoding efficiency may greatly increase. A differential value of the LiDAR signal from which invalid data is not omitted is composed of only one integer and zero "0", such that the highest compression efficiency can be obtained.

Figure 11:
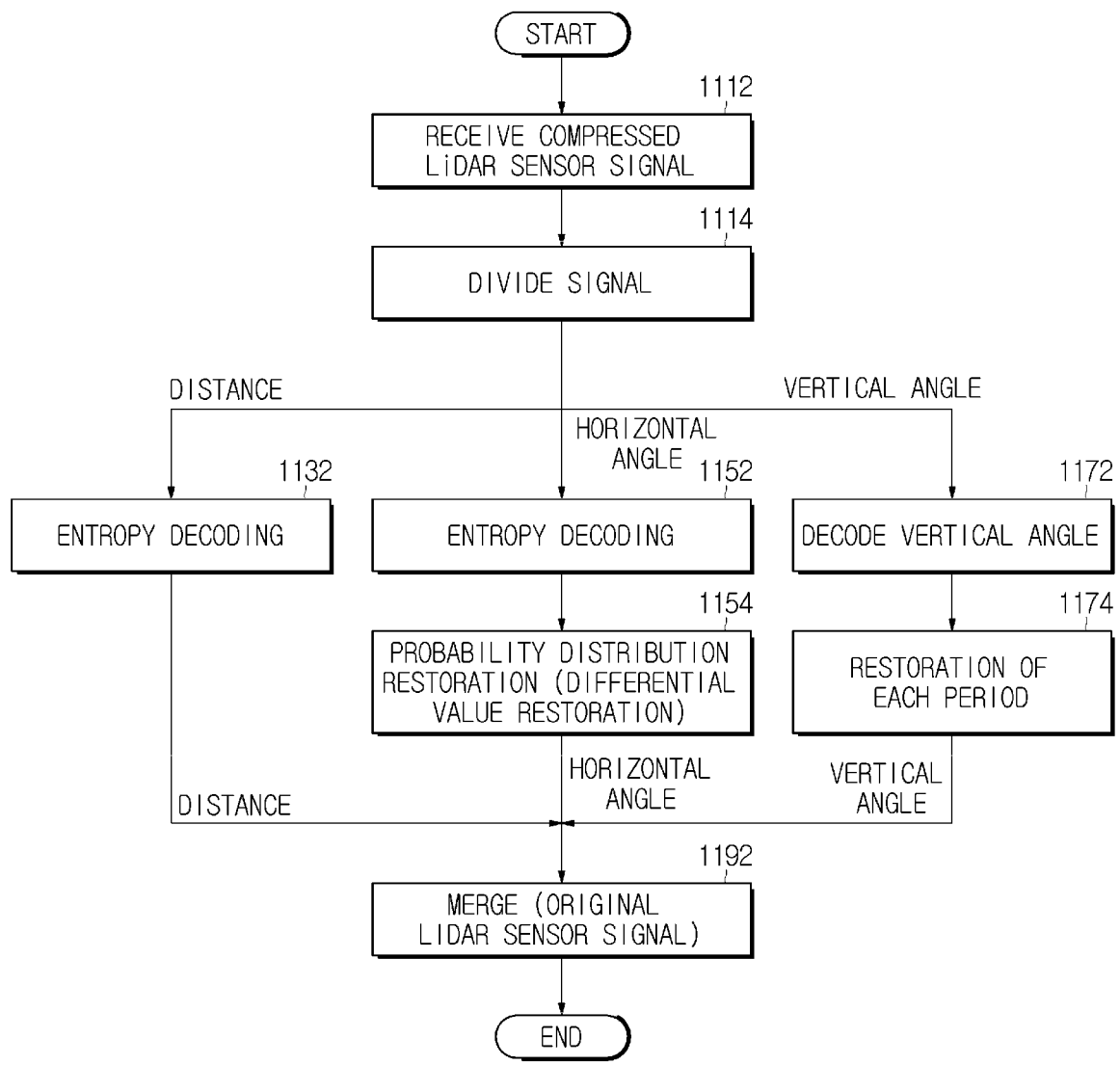
FIG. 11 is a flowchart illustrating a method for restoring (decoding) compressed (encoded) a LiDAR sensor signal in one form of the present disclosure.

FIG. 11 is a flowchart illustrating a method for restoring (decoding) compressed (encoded) a LiDAR sensor signal in some forms of the present disclosure. The LiDAR sensor signal restoration method shown in FIG. 11 is achieved by the signal restoration device 270 shown in FIG. 2.

The LiDAR sensor signal restoration method shown in FIG. 11 may be achieved by reverse order of the compression method shown in FIG. 3. That is, the signal restoration device 270 may receive the compressed LiDAR sensor signal (1124), and may divide the received LiDAR sensor signal into a distance component, a horizontal angle component, and a vertical angle component (1114). The signal restoration device 270 may perform entropy decoding of the distance component (1132). The signal restoration device 270 may perform entropy decoding of the horizontal angle component (1152), and may perform probability distribution restoration (differential value restoration) (1154) of the horizontal angle component. The signal restoration device 270 may perform decoding of the vertical angle component (1172), and may perform restoration for each period (1174). After execution of the above-mentioned operations, the resultant distance component, the resultant horizontal angle component, and the resultant vertical angle component may be merged and thus restored to the original LiDAR sensor signal (1192).

FIGS. 12 to 16 are flowcharts illustrating methods for compressing a LiDAR sensor signal in some forms of the present disclosure. In more detail, parts identical to those of the compression method illustrated in FIG. 3 may be omitted from FIGS. 12 to 16, and only other parts different from those of the compression method illustrated in FIG. 3 will hereinafter be described.

Figure 12:
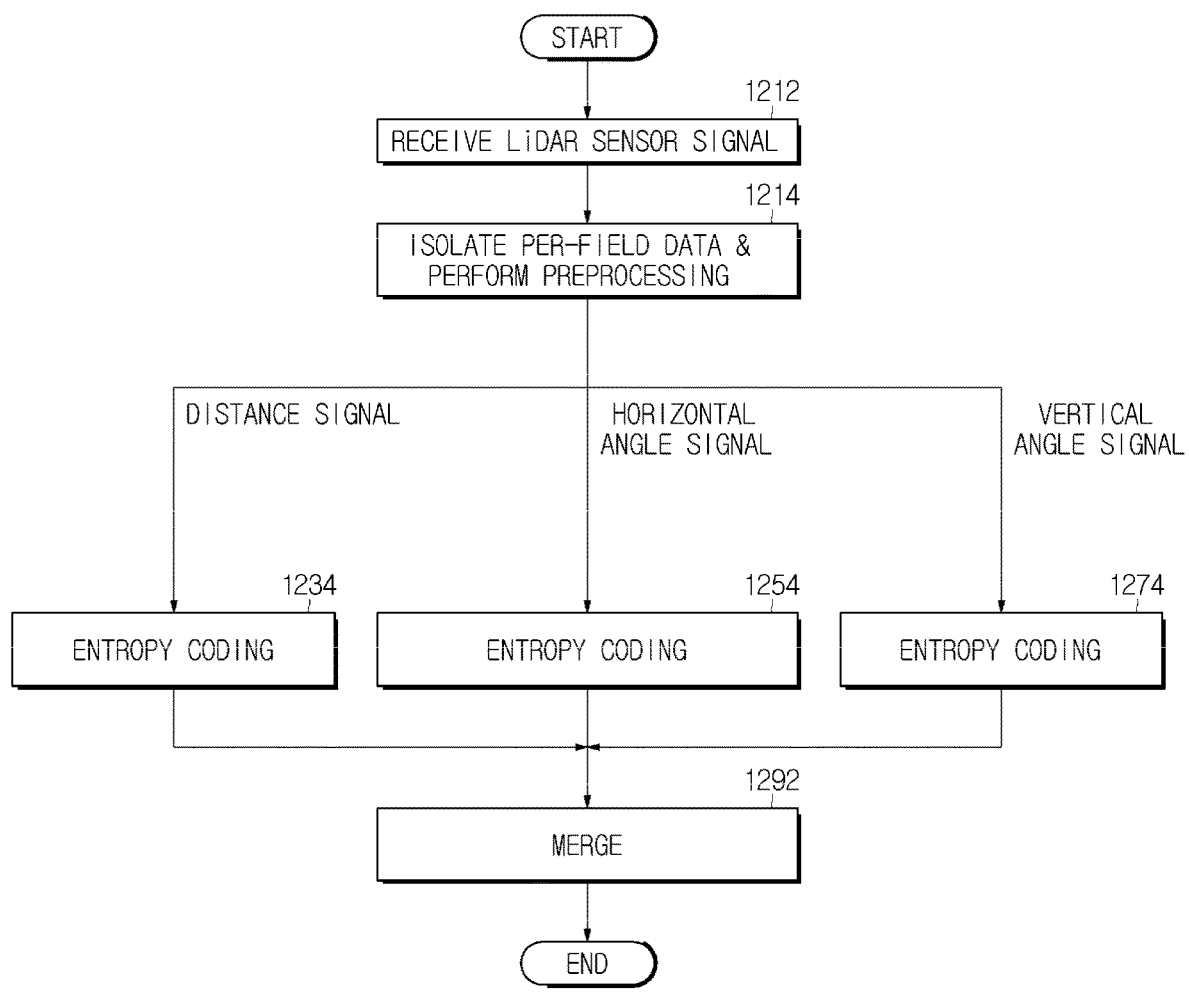
FIG. 12 is a flowchart illustrating a method for compressing a LiDAR sensor signal in a first modified form of the present disclosure.

FIG. 12 is a flowchart illustrating a method for compressing a LiDAR sensor signal according to a first modified form of the present disclosure. Referring to FIG. 12, the signal compression device 250 according to the first modified form may receive the LiDAR sensor signal (1212), may isolate data for each field and perform preprocessing (1214), may divide the LiDAR sensor signal into a distance component, a horizontal angle component, and a vertical angle component, and may perform entropy coding (1234, 1254, and 1274) of the respective divided signals as well as merging (1292). In comparison with FIG. 3, the operation 352 for concentrating probability distribution of the horizontal angle signal, the operation 372 for searching for the period of the vertical angle signal, and the operation 374 for calculating the number of iterations may be omitted from FIG. 12.

Figure 13:
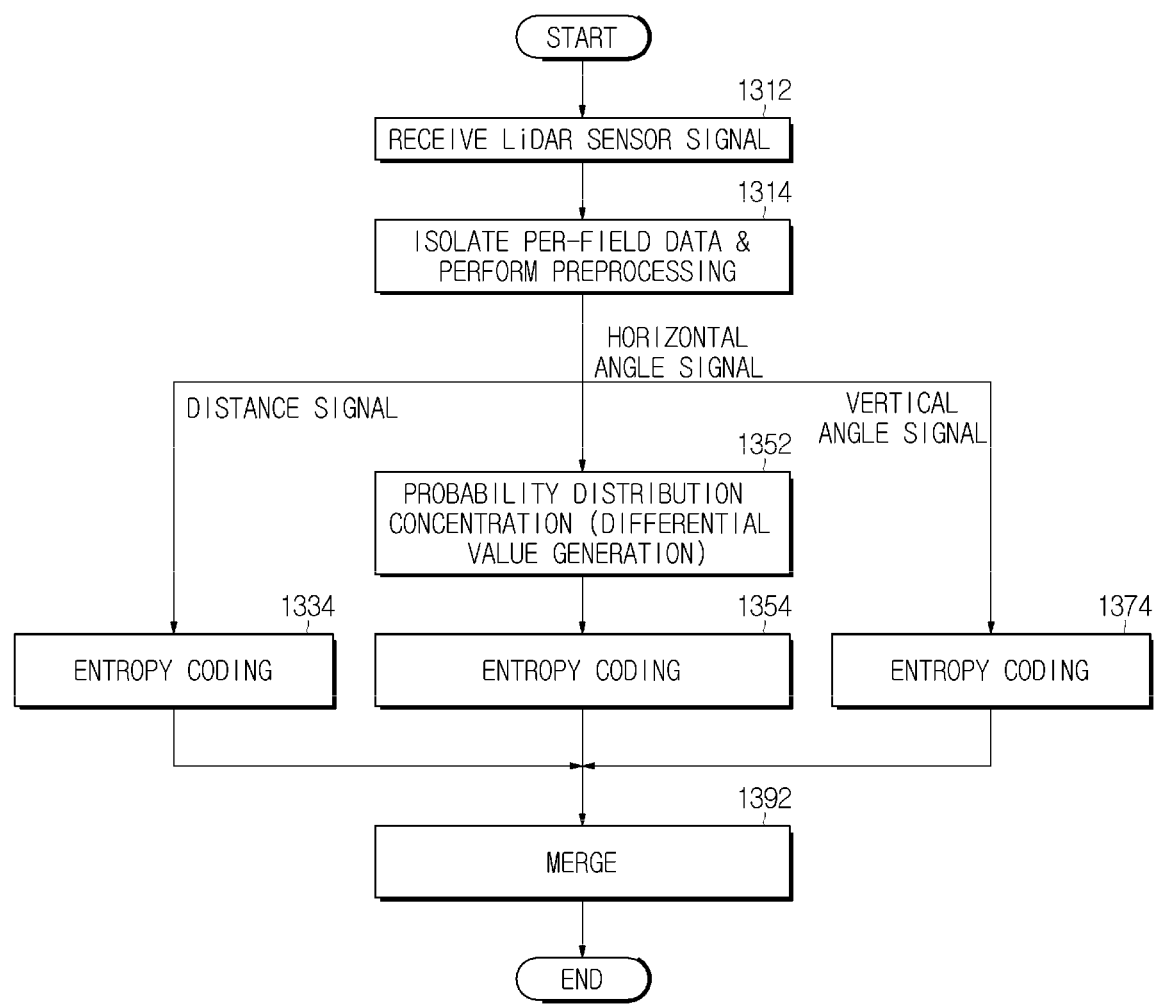
FIG. 13 is a flowchart illustrating a method for compressing a LiDAR sensor signal in a second modified form of the present disclosure.

FIG. 13 is a flowchart illustrating a method for compressing a LiDAR sensor signal according to a second modified form of the present disclosure. Referring to FIG. 13, the signal compression device 250 according to the second modified form may receive the LiDAR sensor signal (1312), may isolate data for each field and perform preprocessing (1314), may divide the LiDAR sensor signal into a distance component, a horizontal angle component, and a vertical angle component, and may perform entropy coding (1334 and 1374) of the distance signal and the vertical angle signal. Then, the signal compression device 250 may perform probability distribution concentration of the horizontal angle signal (1352), and may perform entropy coding (1354) of the horizontal angle signal. Subsequently, the entropy-coded distance signal, the entropy-coded horizontal angle signal, and the entropy-coded vertical angle signal may be merged with one another (1392). In comparison with FIG. 3, the operation 372 for searching for the period of the horizontal angle signal and the operation 374 for calculating the number of iterations may be omitted from FIG. 13.

Figure 14:
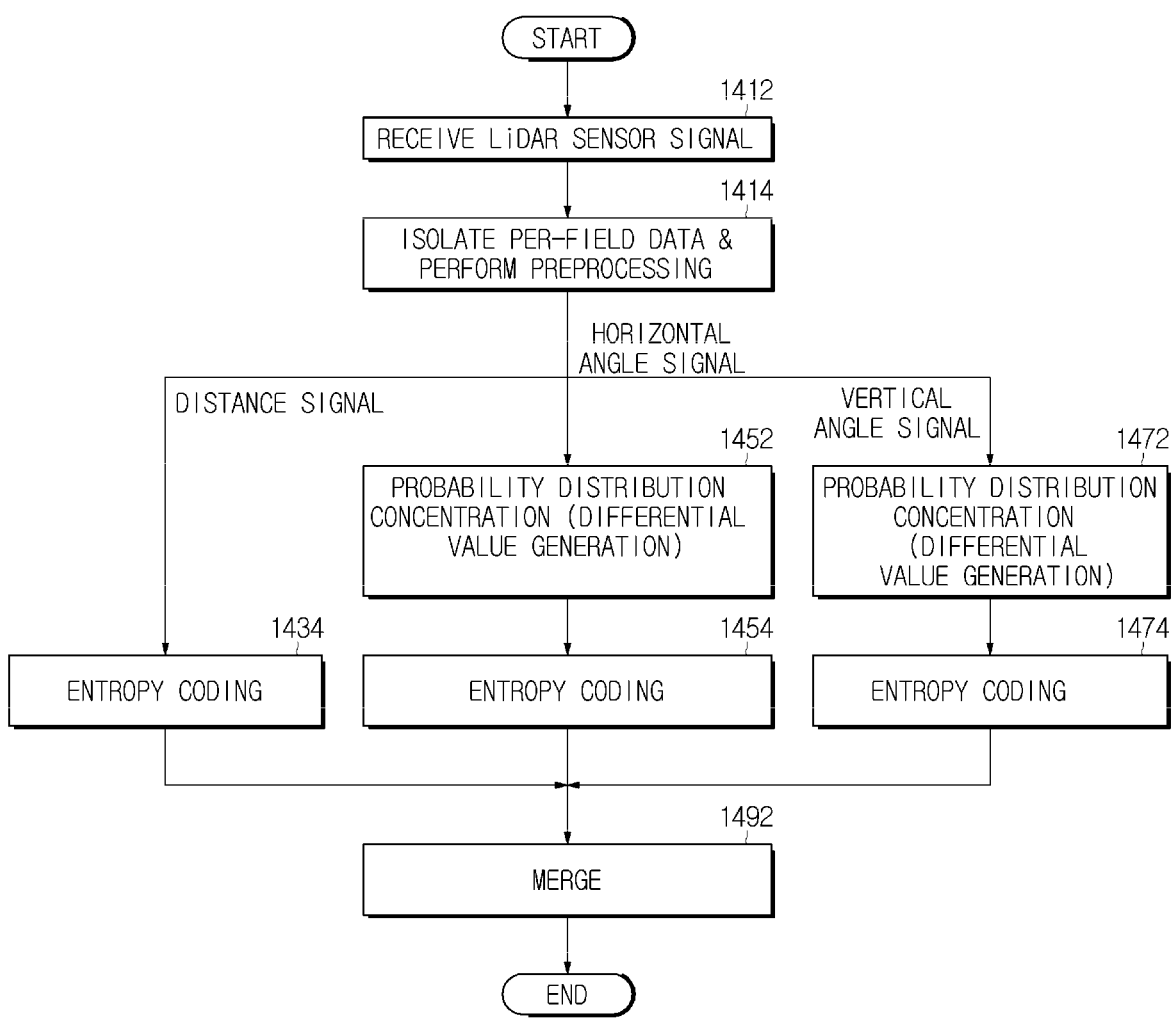
FIG. 14 is a flowchart illustrating a method for compressing a LiDAR sensor signal in a third modified form of the present disclosure.

FIG. 14 is a flowchart illustrating a method for compressing a LiDAR sensor signal according to a third modified form of the present disclosure. Referring to FIG. 14, the signal compression device 250 according to the third modified form may receive the LiDAR sensor signal (1412), may isolate data for each field and perform preprocessing (1414), may divide the LiDAR sensor signal into a distance component, a horizontal angle component, and a vertical angle component, and may perform entropy coding (1434) of the distance signal. Then, the signal compression device 250 may perform probability distribution concentration of the horizontal angle signal (1452), and may perform entropy coding (1454) of the horizontal angle signal. The signal compression device 250 may perform probability distribution concentration of the vertical angle signal (1472), and may perform entropy coding (1474) of the vertical angle signal. Subsequently, the entropy-coded distance signal, the entropy-coded horizontal angle signal, and the entropy-coded vertical angle signal may be merged with one another (1492). In comparison with FIG. 3, the operation 372 for searching for the period of the horizontal angle signal and the operation 374 for calculating the number of iterations may be replaced with the probability distribution concentration (1472) in FIG. 14.

Figure 15:
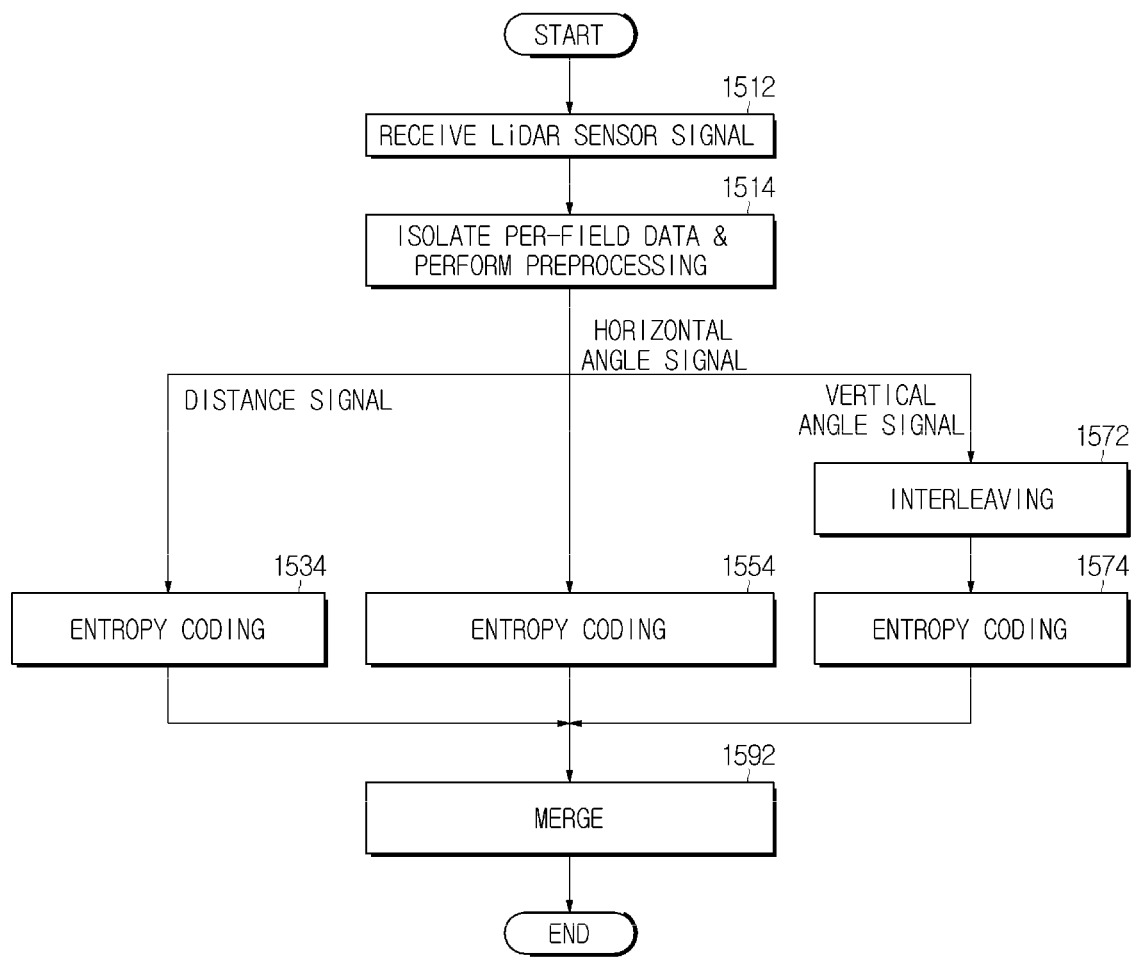
FIG. 15 is a flowchart illustrating a method for compressing a LiDAR sensor signal in a fourth modified form of the present disclosure.

FIG. 15 is a flowchart illustrating a method for compressing a LiDAR sensor signal according to a fourth modified form of the present disclosure. Referring to FIG. 15, the signal compression device 250 according to the fourth modified form may receive the LiDAR sensor signal (1512), may isolate data for each field and perform preprocessing (1514), may divide the LiDAR sensor signal into a distance component, a horizontal angle component, and a vertical angle component, and may perform entropy coding of the distance signal and the horizontal angle signal (1534 and 1554). Then, the signal compression device 250 may perform interleaving of the vertical angle signal (1572), and may perform entropy coding (1574). Subsequently, the entropy-coded distance signal, the entropy-coded horizontal angle signal, and the entropy-coded vertical angle signal may be merged with one another (1592). In comparison with FIG. 3, the operation 352 for performing probability distribution concentration of the horizontal angle signal may be omitted from FIG. 15, and the operation 372 for searching for the period of the vertical angle signal and the operation 374 for calculating the number of iterations may be replaced with the interleaving operation (1572) in FIG. 15. Interleaving is a technology for writing the vertical angle signal in a memory in a horizontal direction and reading the vertical angle signal in the memory in a vertical direction during writing/reading of the vertical angle signal.

Figure 16:
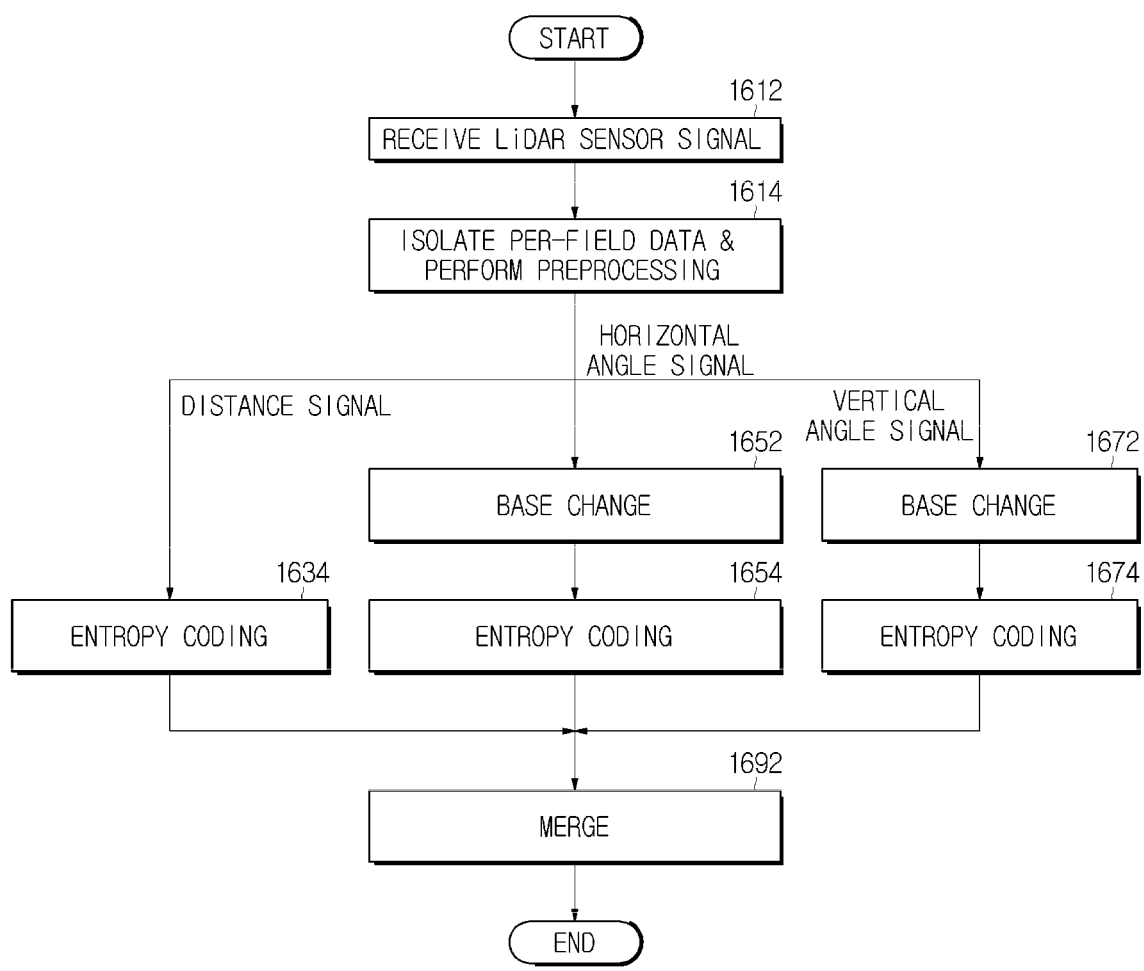
FIG. 16 is a flowchart illustrating a method for compressing a LiDAR sensor signal in a fifth modified form of the present disclosure.

FIG. 16 is a flowchart illustrating a method for compressing a LiDAR sensor signal according to a fifth modified form of the present disclosure. Referring to FIG. 16, the signal compression device 250 according to the fifth modified form may receive the LiDAR sensor signal (1612), may isolate data for each field and perform preprocessing (1614), may divide the LiDAR sensor signal into a distance component, a horizontal angle component, and a vertical angle component, and may perform entropy coding of the distance signal (1634). Then, the signal compression device 250 may perform base change of the horizontal angle signal and the vertical angle signal (1652 and 1672), and may perform entropy coding (1654 and 1674). Subsequently, the entropy-coded distance signal, the entropy-coded horizontal angle signal, and the entropy-coded vertical angle signal may be merged with one another (1692). In comparison with FIG. 3, the operation 352 for performing probability distribution concentration of the horizontal angle signal, the operation 372 for searching for the period of the vertical angle signal, and the operation 374 for calculating the number of iterations may be replaced with the base change operation (1672) in FIG. 16. Base change may include various change steps capable of obtaining probability distribution concentration. For example, the base change may include Fourier Transform or Discrete Cosine Transform.

As is apparent from the above description, a signal compression apparatus and a signal compression method in some forms of the present disclosure may losslessly compress LiDAR sensor signals.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for compressing a signal comprising:
   dividing data into a distance component and an angle component, wherein the data is detected by a distance measurement device;
   dividing the angle component into at least two linear independent basis;
   rearranging the angle component or inserting a dummy signal into arrangement of the angle component such that the arrangement of the angle component has periodicity;
   determining whether an index of a first angle is identical to an index of preceding data from among rearranged data of the detected data; and
   generating a value of the dummy signal when the index of the first angle is determined to be identical to the index of the preceding data from among the rearranged data of the detected data, wherein an index of a second angle is matched with a standard period.

2. The method of claim 1, wherein dividing the data into the angle component comprises:
   dividing the angle component into a first angle component and a second angle component in a condition that a basis vector used for division of a signal vector is not identical to a linear dependent component, wherein the first angle component is configured to monotonically increase or decrease.

3. The method of claim 1, wherein rearranging the angle component comprises:
   rearranging the data based on a first angle component of a same index such that a second angle component has periodicity, wherein the angle component comprises the first angle component and the second angle component.

4. The method of claim 3, wherein rearranging the angle component comprises:
   storing the data in an (N×M) memory space based on an index of the second angle component;
   storing data of the second angle component of the same index in the same row of the (N×M) memory space;
   retrieving and rearranging the data of the second angle component stored in the (N×M) memory space in a column direction of the (N×M) memory space; and
   allowing the second angle component of the data to have periodicity.

5. The method of claim 4, wherein:
   inserting the dummy signal to the rearranged data.

6. The method of claim 5, wherein the dummy signal has an invalid distance component.

7. The method of claim 3, wherein the method further comprises:
   concentrating probability distribution of the first angle component of the data.

8. The method of claim 7, wherein concentrating the probability distribution of the first angle component of the data comprises:
   generating a differential value of the first angle component that is obtained by subtracting a former index value from a latter index value, wherein the former index value and the latter index value form the index of the first angle.

9. The method of claim 3, wherein the method further comprises:
   searching for a period of the second angle component of the data; and
   calculating a number of iterations.

10. The method of claim 9, wherein searching for the period of the second angle component of the data and calculating the number of iterations comprises:
    recording a period between a period description start code and a period description end code; and
    recording the number of iterations in a real number data format.

11. The method of claim 3, wherein the method further comprises:
    concentrating the probability distribution of the first angle component;
    entropy coding the first angle component; and
    entropy coding the distance component and the second angle component without concentrating the probability distribution of the distance component and the second angle component.

12. The method of claim 3, wherein the method further comprises:
    concentrating the probability distribution of the first angle component and the second angle component;
    entropy coding the first angle component and the second angle component; and
    entropy coding the distance component without concentrating the probability distribution of the distance component.

13. The method of claim 3, wherein the method further comprises:
    interleaving the first angle component to search for a period of the first angle component and calculate the number of iterations;

entropy coding the first component; and entropy coding the distance component and the first angle component without interleaving the distance component and the first angle component.

14. The method of claim 3, wherein the method further comprises:

changing a base of the first angle component and the second angle component in a manner that probability distribution of the first angle component is concentrated;

entropy coding the first angle component and the second angle component; and entropy coding the distance component without changing the base of the distance component.

15. The method of claim 1, wherein the standard period is a period of the index of the second angle having no redundancy of the data.

16. The method of claim 1, wherein the method further comprises:

entropy coding the distance component, the first angle component, and the second angle component; and merging the entropy-coded distance component, the entropy-coded first angle component, and the entropy-coded second angle component.

17. A vehicle comprising:

a distance measurement device configured to measure a distance of a target object and a direction of the target object; and a signal compression device configured to:
compress detection data generated from the distance measurement device;
divide the detection data into a distance component and an angle component;
rearrange the angle component or insert a dummy signal into arrangement of the angle component such that the arrangement of the angle component has periodicity;
determine whether an index of a first angle is identical to an index of preceding data from among rearranged data of the detected data; and
generate a value of the dummy signal when the index of the first angle is determined to be identical to the index of the preceding data from among the rearranged data of the detected data, wherein an index of a second angle is matched with a standard period.

18. A device for compressing signal configured to:

divide detection data into a distance component and an angle component when the detection data is received from a distance measurement device; and rearrange the angle component or insert a dummy signal into arrangement of the angle component such that the arrangement of the angle component has periodicity;

determine whether an index of a first angle is identical to an index of preceding data from among rearranged data of the detected data; and generate a value of the dummy signal when the index of the first angle is determined to be identical to the index of the preceding data from among the rearranged data of the detected data, wherein an index of a second angle is matched with a standard period.

19. A distance measurement system comprising:

a distance measurement device configured to measure a distance of a target object and a direction of the target object;

a signal compression device configured to:
receive detection data from the distance measurement device;
divide the detection data into a distance component and an angle component;
rearrange the angle component or insert a dummy signal into arrangement of the angle component such that the arrangement of the angle component has periodicity;
determine whether an index of a first angle is identical to an index of preceding data from among rearranged data of the detected data;
generate a value of the dummy signal when the index of the first angle is determined to be identical to the index of the preceding data from among the rearranged data of the detected data, wherein an index of a second angle is matched with a standard period; and
compress the detection data; and a signal restoration device configured to restore the detection data compressed by the signal compression device to an original signal.

* * * * *